United States Patent [19]
Roberts et al.

[11] Patent Number: 5,253,254
[45] Date of Patent: Oct. 12, 1993

[54] TELECOMMUNICATIONS SYSTEM WITH ARBITRARY ALIGNMENT PARALLEL FRAMER

[75] Inventors: Martin Roberts, Rohnert Park; David L. Manley, Cotati, both of Calif.

[73] Assignee: DSC Communications Corporation, Plano, Tex.

[21] Appl. No.: 761,492

[22] Filed: Sep. 18, 1991

[51] Int. Cl.$^5$ ............................................. H04J 3/06
[52] U.S. Cl. .................................... 370/100.1; 375/38
[58] Field of Search .................... 370/100.1, 102, 108, 370/58.3; 375/38, 106, 102, 118; 455/59

[56] References Cited

U.S. PATENT DOCUMENTS

| | | | |
|---|---|---|---|
| 4,818,995 | 4/1989 | Takahashi et al. | 375/38 |
| 5,060,239 | 10/1991 | Briscoe et al. | 375/38 |
| 5,134,633 | 7/1992 | Werner | 375/38 |

FOREIGN PATENT DOCUMENTS

| | | |
|---|---|---|
| 0285158 | 3/1988 | European Pat. Off. |
| 0443376 | 2/1991 | European Pat. Off. |
| 2467516 | 9/1080 | France |

*Primary Examiner*—Douglas W. Olms
*Assistant Examiner*—Shick Hom
*Attorney, Agent, or Firm*—Baker & Botts

[57] ABSTRACT

A high-speed communication system (32) comprises a serial-to-parallel converter (38) for arbitrary converting a stream of serial data to a stream of arbitrarily aligned parallel data. A pattern detector (44) is coupled to the serial-to-parallel converter (38) for detecting a predetermined pattern from the stream of parallel data and generating a phase signal responsive to the detection of the pattern. An aligner (42) coupled to the pattern detector (44) generates an aligned stream of parallel data responsive to the phase signal.

24 Claims, 2 Drawing Sheets

TELECOMMUNICATIONS SYSTEM WITH ARBITRARY ALIGNMENT PARALLEL FRAMER

TECHNICAL FIELD OF THE INVENTION

This invention relates in general to telecommunications systems, and more particularly to a telecommunications system having an arbitrary alignment parallel framer.

BACKGROUND OF THE INVENTION

Many modern communication protocols transmit multiple data words in a "frame" of information. The frame includes a framing pattern, which is a predetermined combination of bits indicating the start of a frame. The frame pattern is followed by header information and data. Protocols which use this general data structure include SONET, DMI and ISDN.

Importantly, the framing information defines the beginning of a frame, such that the header information and data may be converted into the correctly aligned words. Modern communication systems necessarily use multiple device technologies to demultiplex high-speed digital signals. In order to perform serial-to-parallel conversion, high-speed technologies are used. High-speed technologies, however, are expensive and require a high power consumption.

Since the serial-to-parallel conversion process must be aligned to the frame pattern in order to correctly demultiplex the information contained in each frame, the circuitry for detecting the imbedded frame alignment pattern is also performed in the high-speed circuitry. This has two undesirable consequences. The frame pattern detector, control logic and timing generator must be implemented in the high-speed circuitry which is expensive and consumes significant power. Further, the serial-to-parallel convertor is dependent upon the pattern detection and control circuitry, thereby increasing the circuitry in the data path. The extra circuitry limits the maximum bit rate at which the system will operate. Also, since many of the other demultiplexing functions are performed in low-speed circuitry, signals must pass between the high-speed and low-speed devices to report, for example, loss of frame conditions and frame control signals.

Therefore, a need has arisen in the industry to provide a communication system wherein frame alignment may be performed in low-speed circuitry.

SUMMARY OF THE INVENTION

In accordance with the present invention, a method and apparatus is provided which substantially reduces disadvantages associated with prior art telecommunication devices.

In the present invention, a high-speed communication system comprises a serial-to-parallel converter for receiving a stream of serial data and converting the stream of serial data to a stream of arbitrarily aligned parallel data. A pattern detector coupled to the serial-to-parallel converter detects a predetermined pattern from the stream of parallel data and generates a signal responsive to detecting the pattern. An aligner coupled with the pattern detector generates an aligned stream of parallel data aligned to the pattern responsive to the signal.

The present invention provides significant advantages over the prior art. First, the high-speed device need only perform the serial-to-parallel conversion and timing generation, thereby reducing its cost and power dissipation. Second, the high-speed timing generator associated with the serial-to-parallel converter requires no feedback from the frame pattern detection hardware, and may therefore operate at the maximum bit rates supported by the chosen technology. Third, the communications between the high-speed and low-speed circuitry is minimized. Fourth, since the high-speed device is independent of the communications protocol, a single high-speed design may be used for any signal format or bit rate, with any necessary design or configuration changes being made only in the low-speed device.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–5 of the drawings, like numerals being used for like and corresponding parts of the various drawings.

Figure 1:
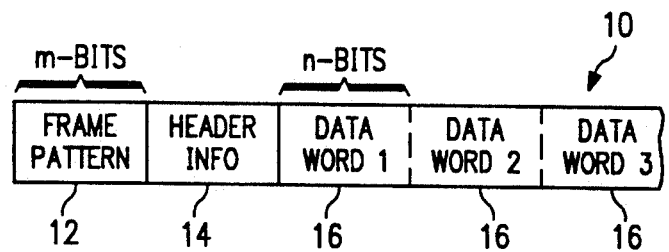
FIG. 1 illustrates an exemplary frame of data.

FIG. 1 illustrates the structure of a data frame 10. The data frame of FIG. 1 is meant to generally illustrate a time division multiplexed frame; many communications protocols, such as SONET and ISDN, have structures generally the same as that shown in FIG. 1.

A frame pattern 12 comprises m-bits. For example, the frame pattern for a SONET protocol at 50 MHz is F628. After the frame pattern 12, header information 14 is provided which is used by the communication systems for error checking and other maintenance functions. After the header information, a plurality of n-bit data words 16 follow. The number of data words in each frame depends upon the protocol and the length of the data words.

Figure 2:
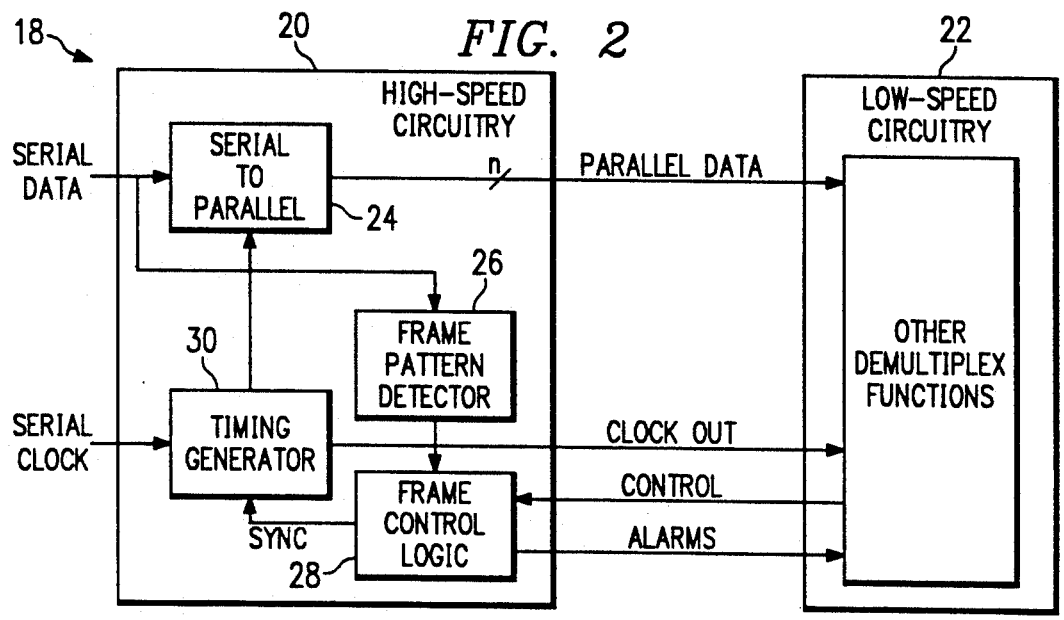
FIG. 2 illustrates a block diagram of a prior art communication system.

FIG. 2 illustrates a prior art communication system 18 wherein serial data, transmitted in accordance with a frame such as shown in FIG. 1, is converted to parallel data in high-speed circuitry 20 and the remainder of the demultiplexing functions are implemented in the low-speed circuitry 22. The demultiplexing functions performed by the low-speed circuitry 22 would include frame alignment verification, out-of-frame detection, bit error detection and channel separation.

High-speed circuitry 20 includes a serial-to-parallel converter 24 which receives serial data and outputs n-bit parallel data. A frame pattern detection subsystem comprises frame pattern detector 26, frame control logic 28 and timing generator 30. The frame pattern detection subsystem provides the correct signals to the serial-to-parallel converter such that the parallel data output from the converter 24 is properly aligned. The frame pattern detector 26 detects the occurrence of the frame pattern in serial data. Typically, the frame pattern detector 26 comprises a shift register and a comparator. The frame pattern detector 26 outputs a signal to the frame control logic 28 upon detecting the frame pattern. The frame control logic 28 outputs a "sync" signal to timing generator 30 which is also coupled to a serial clock synchronized to the serial data. The timing generator 30 outputs a signal to the serial-to-parallel converter 24 to indicate the detection of a frame pattern. The frame control logic receives control signals from the low-speed circuitry 22 and outputs alarms to the low-speed circuitry 22.

This solution has several disadvantages. A significant number of functions needed for frame pattern detection and timing generation must be implemented in high-speed technology which is costly in both power requirements and expense. The timing generation to the serial-to-parallel converter 24 is critical to correct alignment; due to the significant amount of circuitry involved in detecting the frame patterns, the maximum bit rate at which the communication system 18 can operate is limited. Further, the communication system 18 requires significant communication between the high-speed circuitry 20 and the low-speed circuitry 22.

Figure 3:
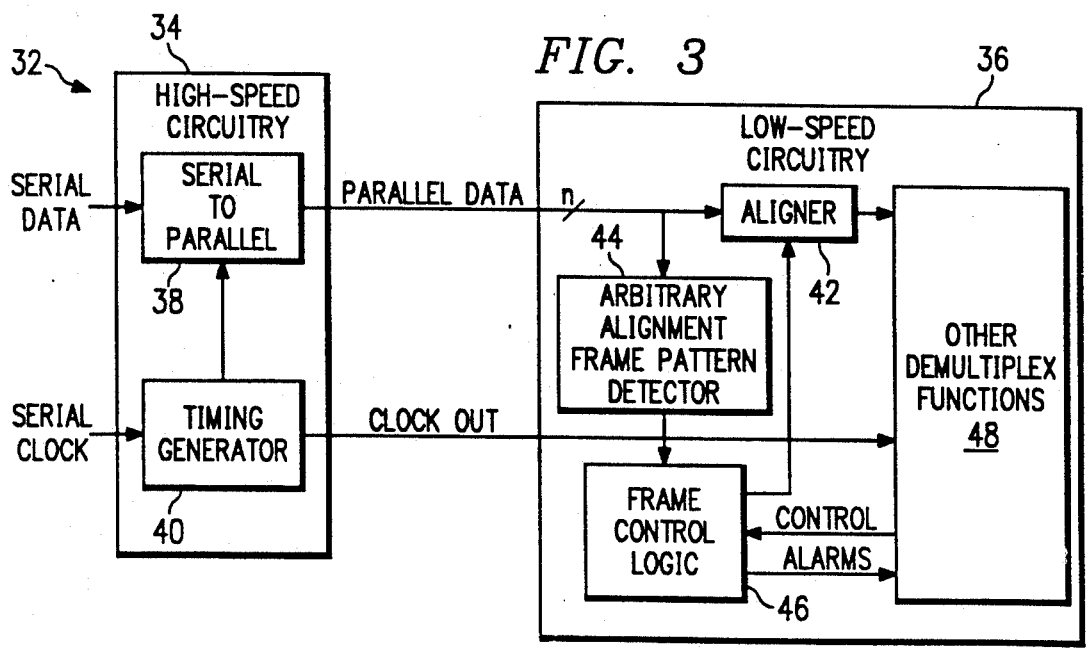
FIG. 3 illustrates a block diagram of the communication system of the present invention.

FIG. 3 illustrates the communication system 32 of the present invention. The communication circuitry comprises high-speed circuitry 34 and low-speed circuitry 36. The high-speed circuitry 34 comprises a serial-to-parallel converter 38 and a timing generator 40. The serial-to-parallel converter 38 outputs n-bit parallel data to the low-speed circuitry 36, as well as a CLOCK OUT signal from the timing generator. The n-bit parallel data is input to an aligner 42 and an arbitrary alignment frame pattern detector 44. The arbitrary alignment frame pattern detector 44 outputs a control signal to the frame control logic 46 which outputs a signal to the aligner 42. Further, the frame control logic 46 exchanges control signals and alarms with other low-speed demultiplexing functions 48.

As can be seen, the communication system 32 of the present invention implements all frame pattern detection within the low-speed circuitry 36. Further, only the parallel data and the CLOCK OUT signal are output from the high-speed circuitry to the low-speed circuitry, thereby reducing the communications between the two circuits.

In operation, the serial data is converted to parallel data by the serial-to-parallel converter 38 arbitrarily; i.e., without regard to the beginning of a frame. The arbitrary alignment frame pattern detector detects the frame pattern from one or more consecutive n-bit words output from the serial-to-parallel converter 38. Upon detection of the frame pattern, the control logic 46 is signalled, which in turn informs the aligner 42 of the correct alignment of the n-bit data words. In response, the aligner 42 combines bits of consecutive n-bit words received from the serial-to-parallel converter in order to output aligned n-bit words to the other demultiplexing functions 48.

Figure 4:
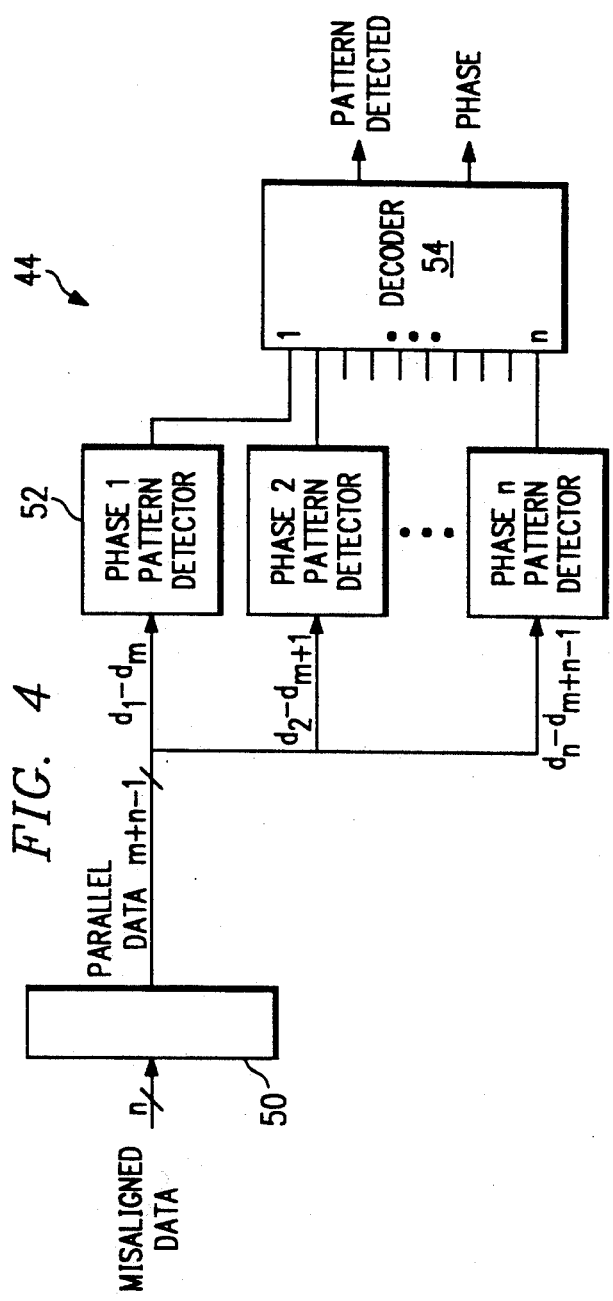
FIG. 4 illustrates a block diagram of the arbitrary alignment frame pattern detector of FIG. 3.

FIG. 4 illustrates a more detailed view of the arbitrary alignment frame pattern detector 44. The frame pattern detector 44 receives n-bit parallel data from the serial-to-parallel converter 38 and loads the data into a register 50 which stores at least the last n+m−1 bits received, where m is the number of bits in the header frame pattern. The register may be implemented using, for example, a number of n-bit latches coupled in series. A plurality of pattern detectors 52 are coupled to the shifter 50. Each pattern detector 52 is coupled to m contiguous bits from the shifter 50, with each pattern detector 52 starting at a consecutive bit. Hence, the phase one pattern detector is coupled to bits $d_1$ through $d_m$, where $d_x$ corresponds to the $x^{th}$ bit from shifter 50, with $d_1$ being the most recently received bit. Thus, the phase two pattern detector receives bits $d_2$ through $d_{m+1}$ and the last pattern detector (the phase n pattern detector) receives data bits $d_n$ through $d_{m+n-1}$. Each of the pattern detectors comprises a comparator which compares the received bits to the predetermined frame pattern.

Each pattern detector outputs a detect signal to a decoder 54. Assuming, each pattern detector initially outputs a low detect signal, the pattern detector 52 outputs a "1" or high detect signal when the received bits are equal to the predetermined frame pattern. Responsive to the outputs of the pattern detectors, the decoder outputs a pattern detected signal indicating whether a pattern was detected, an a phase signal indicative of the phase, i.e., which pattern detector 52 detected the pattern. In operation, the proper alignment may be determined from the phase signal. For example, if the phase one pattern detector identifies the frame pattern, the parallel data is aligned with the framing pattern. If the phase two pattern detector identifies the frame pattern, it can be determined that the parallel data is misaligned by one bit. Realignment of the data is performed by the aligner 42.

Figure 5:
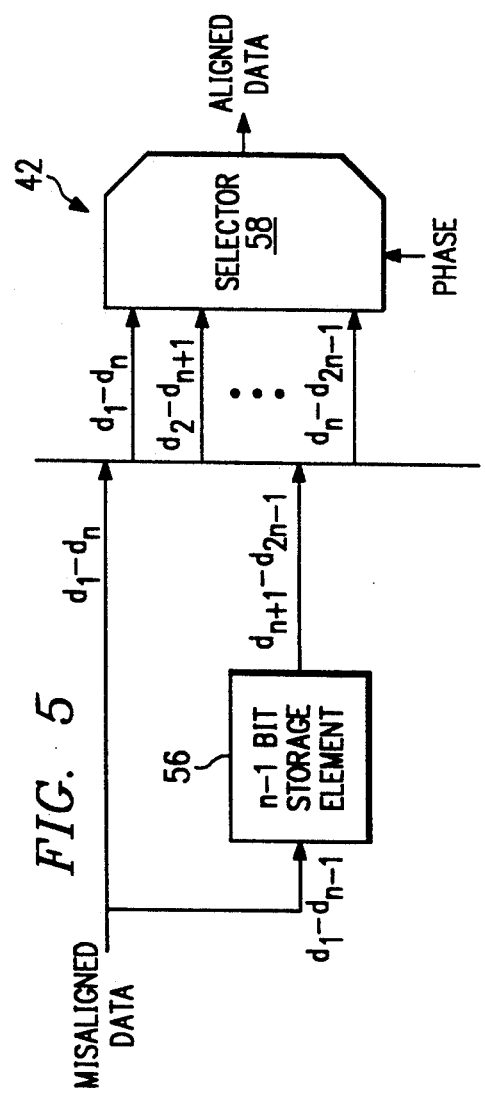
FIG. 5 illustrates a block diagram of the aligner circuitry of FIG. 3.

The aligner 42 is illustrated in FIG. 5. The "misaligned" data from the serial-to-parallel converter 38 is received by the aligner 42. An n−1 bit storage element 56, which may be part of shifter 50, stores n−1 bits of the previously received data word. Hence, the combination of the output of the serial-to parallel converter 38 with the output of the storage element 56 provides the last 2n−1 bits of data. The 2n−1 bits provide n sets of contiguous bits. A selector 58 chooses one of the n sets of contiguous bits and outputs the aligned data. The selection of the bits is made responsive to the phase signal from the decoder 54. The selector 58 may be an n×n multiplexer, wherein the phase signal selects one of the n-bit words coupled to the multiplexer. Thus, if the phase two pattern detector detected the frame pattern, a phase of two would be output and the word formed by bits $d_2$ through $d_{n+1}$ would be output as the aligned data. The aligned data is received by the other demultiplexer functions 48 for processing.

The present invention provides significant advantages over the prior art. First, the high-speed device contains a minimum of logic, and therefore its cost and power dissipation are minimized. Since the low-speed circuitry will operate at a speed which is approximately one $n^{th}$ of the high-speed circuitry, considerable savings are realized. Second, the high-speed timing generator requires no feedback or control, and may therefore operate at the maximum bit rates supported by the chosen technology. Third, the communications between the high-speed and low-speed circuitry is minimized to only a CLOCK and DATA path. Fourth, since the high-speed device is independent of the communications protocol, a single high-speed device design may be used for any signal format or bit rate, with any necessary design or configuration changes being made only in the low-speed device.

Although the present invention and its advantages have been described in detail, it should be understood that various changes, substitutions and alterations can be made herein without departing from the spirit and scope of the invention as defined by the appended claims.

What is claimed is:

1. A high speed communication system comprising:
   a serial-to-parallel converter for receiving a stream of serial data and converting the stream of serial data to a stream of arbitrarily aligned parallel data;
   a pattern detector coupled to said serial to parallel converter for detecting a predetermined pattern from said stream of arbitrarily aligned parallel data and generating a phase signal responsive to detecting said pattern; and
   an aligner coupled to said pattern detector for generating a stream of parallel data aligned to said predetermined pattern responsive to said phase signal.

2. The communication system of claim 1 wherein said serial-to-parallel converter converts said serial data to arbitrarily aligned parallel data comprising n-bit words.

3. The communication system of claim 2 wherein said pattern detector comprises a storage circuitry for storing a predetermined number of most recently received bits of said n-bit words.

4. The communication system of claim 3 wherein said pattern detector comprises n comparators for comparing said predetermined pattern with a respective set of contiguous bits stored in said storage circuitry.

5. The communication system of claim 4 wherein said predetermined pattern comprises m bits and wherein each of said comparators compares said predetermined pattern with m contiguous bits stored in said storage circuitry, each comparator starting at a different bit location in said storage circuitry.

6. The communication system of claim 5 wherein said pattern detector further comprises a decoder coupled to the comparators for generating said phase signal responsive to the outputs of the comparators.

7. The communication system of claim 6 wherein said aligner circuitry comprises circuitry for storing n−1 bits of the previous word and circuitry for combining a portion of said n−1 stored bits with a portion of bits from the current word responsive to said phase signal to produce parallel data aligned with said predetermined pattern.

8. The communication system of claim 7 wherein said combining circuitry comprises a multiplexer receiving n sets of n-bit words each set being one bit out of phase, said multiplexer selecting one of said sets responsive to said phase signal.

9. A method of performing high-speed communications comprising the steps of:
   converting a stream of serial data to a stream of arbitrarily aligned parallel data;
   detecting a predetermined pattern from said stream of arbitrarily aligned parallel data and generating a phase signal responsive to detecting said pattern; and
   aligning said stream of arbitrarily aligned parallel data and generating a stream of aligned parallel data responsive to said phase signal.

10. The method of claim 9 wherein said step of converting comprises the step of converting said serial stream of data into n-bit words.

11. The method of claim 10 wherein said detecting step includes the step of storing a predetermined number of most recently received bits of said n-bit words.

12. The method of claim 11 wherein said detecting step further comprises the step of comparing said predetermined pattern with n sets of contiguous bits of said stored words.

13. The method of claim 12 wherein said comparing step comprises n comparing sets of m contiguous bits of said stored words with said predetermined pattern, each set starting at a different bit location.

14. The method of claim 13 wherein said comparing step further comprises the step of generating said phase signal responsive to said predetermined pattern equalling one of said sets.

15. The method of claim 14 wherein said detecting step further comprises the step of generating said phase signal indicative of which set equals the predetermined pattern.

16. The method of claim 15 wherein said aligning step comprises the steps of storing n−1 bits of the previous n-bit word and combining a portion of said n−1 stored bits with a portion of bits from the current word to produce parallel data aligned with the predetermined pattern.

17. The method of claim 16 wherein said aligning step comprises the step of multiplexing one of n sets of words formed from contiguous bits of said current word and said stored bits responsive to said phase signal.

18. A high speed communication system comprising:
   a serial-to-parallel converter for receiving a serial stream of bits and converting the serial stream of bits to a stream of arbitrarily aligned n-bit words;
   a pattern detector coupled to said serial-to-parallel converter for detecting a predetermined pattern within consecutive words and for outputting a phase signal indicative of the location of said predetermined pattern within said arbitrarily aligned words; and
   an aligner for generating words aligned responsive to the location of said predetermined pattern.

19. The communication system o claim 18 wherein said serial-to-parallel converter comprises a high speed circuit and said detector and said aligner comprise a low speed circuit.

20. The communication system of claim 18 wherein said pattern detector comprises n comparators for comparing said predetermined pattern to respective sets of bits comprised of the most recently received m+n−1 bits form the stream of arbitrarily aligned parallel words, where m comprises the number of bits in said predetermined pattern.

21. The communication system of claim 20 wherein said aligner comprises circuitry for forming an aligned word from the most recently received 2n−1 bits from the steam of arbitrarily aligned parallel words.

22. A method of high-speed communication comprising the steps of:
   receiving a serial steam of bits;
   converting the serial stream of bits to a stream of arbitrarily aligned n-bit words;
   detecting a predetermined pattern within consecutive said arbitrarily aligned words;
   outputting a phase signal indicative of the location of said predetermined pattern within said consecutive words; and
   generating words aligned to said predetermined pattern responsive to the location of said predetermined pattern within said consecutive words.

23. The method of claim 22 wherein said detecting step comprises comparing said predetermined pattern to n sets of bits comprised of the most recently received m+n−1 bits from the stream of arbitrarily aligned parallel words, where m comprises the number of bits in said predetermined pattern.

24. The method of claim 22 wherein said aligning step comprises forming an aligned word from the most recently received 2n−1 bits from the stream of arbitrarily aligned parallel words responsive to detecting an equivalence between one of said sets and said predetermined pattern.

* * * * *

UNITED STATES PATENT AND TRADEMARK OFFICE
CERTIFICATE OF CORRECTION

PATENT NO. : 5,253,254
DATED : October 12, 1993
INVENTOR(S) : Roberts et al

It is certified that error appears in the above-indentified patent and that said Letters Patent is hereby corrected as shown below:

Column 4, line 19, after "was detected", delete "an" and insert --and--.

Column 6, line 4, after "step comprises", delete "n comparing" and insert --comparing $n$--.

Column 6, line 38, after "communication system" delete "o" and insert --of--.

Column 6, line 46, after "bits", delete "form" and insert --from--.

Column 6, line 52, after "the", delete "steam" and insert --stream--.

Column 6, line 55, after "receiving a serial", delete "steam" and insert --stream--.

Signed and Sealed this

Twenty-third Day of August, 1994

Attest:

BRUCE LEHMAN

*Attesting Officer*  *Commissioner of Patents and Trademarks*